United States Patent

Borst et al.

Patent Number: 6,134,442
Date of Patent: Oct. 17, 2000

[54] CONTROLLING OPERATIONS IN A CELLULAR SYSTEM USING NEIGHBOR ASSOCIATION-BASED COST VALUES

[75] Inventors: Simon C. Borst, North Plainfield; Terry Si-Fong Cheng, Randolph; Sudheer A. Grandhi, Lake Hiawatha; Joe Huang, Bloomfield; Colin L. Kahn, Cedar Knolls; Krishnan Kumaran, Scotch Plains; Bulin B. Zhang, Branchville, all of N.J.

[73] Assignee: Lucent Technologies Inc., Murray Hill, N.J.

[21] Appl. No.: 09/035,006

[22] Filed: Mar. 5, 1998

[51] Int. Cl.[7] .................. H04J 1/16; H04Q 7/00
[52] U.S. Cl. .................. 455/445; 455/447; 455/452; 370/238; 370/329
[58] Field of Search .................. 455/445, 446, 455/447, 452, 453, 509, 514; 370/238, 329, 332, 333

[56] References Cited

U.S. PATENT DOCUMENTS

| 5,428,815 | 6/1995 | Grube .................................... 455/447 |
| 5,432,780 | 7/1995 | Smith et al. . |
| 5,437,868 | 8/1995 | Oakes et al. .............................. 424/405 |
| 5,448,750 | 9/1995 | Eriksson et al. ......................... 455/33.1 |
| 5,471,671 | 11/1995 | Wang et al. ........................... 455/226.2 |
| 5,519,884 | 5/1996 | Duque-Anton et al. ................ 455/33.1 |
| 5,586,170 | 12/1996 | Lea ............................................ 379/60 |
| 5,590,395 | 12/1996 | Diekelman .............................. 455/13.1 |
| 5,669,062 | 9/1997 | Olds et al. ................................ 455/509 |
| 5,809,423 | 9/1998 | Benveniste ............................... 455/452 |
| 5,826,189 | 10/1998 | Thapa et al. ............................. 455/428 |
| 5,839,075 | 11/1998 | Haartsen et al. ........................ 455/450 |
| 5,862,479 | 1/1999 | Cutler, Jr. et al. ...................... 455/428 |
| 5,886,988 | 3/1999 | Yun et al. ................................ 370/329 |
| 5,887,263 | 3/1999 | Ishii ......................................... 455/452 |
| 5,926,763 | 7/1999 | Greene, Sr. et al. .................... 455/450 |
| 5,946,625 | 8/1999 | Hassan et al. ........................... 455/447 |
| 5,956,643 | 9/1999 | Benveniste ............................... 455/452 |
| 5,991,622 | 11/1999 | Henry, Jr. ................................ 455/434 |

FOREIGN PATENT DOCUMENTS

08079150  3/1996  Japan .

*Primary Examiner*—Douglas W. Olms
*Assistant Examiner*—David R Vincent
*Attorney, Agent, or Firm*—Steve Mendelsohn

[57] ABSTRACT

Operations in a cellular system are controlled based on cost values that are generated using neighbor association. In neighbor association, each cost value corresponds to a cost of assigning a candidate channel to a first cell in the cellular system, assuming that the candidate channel is already assigned to a second cell in the cellular system and each cost value is based on an average power attenuation for all of the cells in the cellular system that share the same tier as the second cell with respect to the first cell, wherein the average power attenuation is based on the reuse distances between the first cell and the cells in the same tier. In one embodiment, the cost values are used in a cost-function-based dynamic channel assignment (DCA) algorithm that is, but does not have to be, applied to a list of candidate channels generated using a measurement-based DCA algorithm.

21 Claims, 6 Drawing Sheets

- SIGNAL FROM CELL 1 INTERFERES WITH SIGNAL FROM CELL 2 AT MOBILE Y
- SIGNAL FROM MOBILE Y INTERFERES WITH SIGNAL FROM MOBILE X AT CELL 1

CONTROLLING OPERATIONS IN A CELLULAR SYSTEM USING NEIGHBOR ASSOCIATION-BASED COST VALUES

CROSS-REFERENCES TO RELATED APPLICATIONS

This is related to copending application Ser. No. 08/811,986 ("the '986 application").

BACKGROUND OF THE INVENTION

1. Field of the Invention

The present invention relates to communications, and, in particular, to cellular telecommunication systems.

2. Description of the Related Art

A typical cellular telecommunication system has one or more mobile switching centers (MSCs), for example, located in the central offices of a company that provides telecommunication services, where each MSC controls the operations of multiple cell sites. A cell site (also referred to as a cell) corresponds to a set of co-located uplink and downlink antennas that support communications with the mobile units (e.g., cellular telephones) currently located within a coverage area around the cell site. The locations of cell sites are preferably distributed to provide contiguous coverage over a relatively wide telecommunication service region. In order to ensure this contiguous coverage, cell sites are positioned such that their coverage areas overlap to some extent with the coverage areas of adjacent cell sites. This overlapping also enables a mobile user to move from one cell site to another without losing telecommunication service. This process is referred to as a handoff, as the responsibility for communicating with the mobile unit is handed off (i.e., transferred) from one cell site to the other.

One type of cellular system uses both frequency division multiple access (FDMA) and time division multiple access (TDMA) communication techniques. Such a cellular system is typically assigned two different frequency bands for its communications: one for downlink communications from the cell sites to the mobile units and the other for uplink communications from the mobile units to the cell sites. Pursuant to FDMA schemes, each frequency band is divided into multiple frequency sub-bands called channels. Pursuant to TDMA schemes, communications on each channel are time-multiplexed into different periodic time slots. When communications are to be established between a cell site and a mobile unit located within the coverage area of the cell site, the mobile unit is assigned a particular channel and time slot in each of the downlink and uplink frequency bands within which signals to and from the mobile unit are to be transmitted. Responsibility for assigning channels and time slots rests with the MSC, which is constantly receiving information from and transmitting instructions to its cell sites.

One of the primary functions of the MSC is to assign channels and time slots so as to minimize interference between the mobile units currently in use within the overall telecommunication service region. If two mobile units located within the same cell site or even within adjacent cell sites are assigned the same channel and time slot, their signals will interfere with one another which may result in corrupted communications. Such interference may even result when the mobile units are separated from one another by one or more intervening cell sites. The MSC is responsible for assigning channels and time slots to all of the mobile units in an efficient and effective manner with minimization of interference, while achieving high capacity as a goal.

One traditional scheme for assigning channels is referred to as fixed channel assignment (FCA) in which specific channels are manually and permanently assigned to specific cell sites. Under FCA, channels are assigned when the cellular system is designed such that the same channels are not available in adjacent and perhaps even in relatively nearby cell sites. In this way, it can in theory be guaranteed that no two mobile units will interfere with one another. FCA has a number of limitations. First of all, when new cell sites are added to the overall coverage region, the task of assigning channels to the new cell site and possibly reassigning channels to the existing cell sites can be extremely complicated, especially when a new cell site is added to the interior of the overall system coverage region.

In addition, permanently assigning channels to cell sites does not take into consideration the fact that the number of mobile users within a cell site will vary over time. For example, if a football stadium and the surrounding parking lots are covered by different cell sites, the number of mobile units that need to be supported within the football stadium during a football game will be much greater than the number of mobile units in the parking lots. By the same token, the opposite will be true immediately before and after the game. As illustrated by this example, permanently assigning channels to cell sites leads to inefficient allocation of communication resources.

Another scheme for assigning channels is referred to as dynamic channel assignment (DCA) in which channels are assigned to cell sites in real time as they are needed to support communications with mobile units within the coverage areas of the different cell sites. DCA offers better performance than FCA due to more efficient trunking (i.e., assignment) of channels. Higher efficiency is obtained since all channels in the spectrum are potentially available for use at each cell (or sector for those cells that are divided into multiple sectors). DCA schemes fall into two classes. The first is based on radio frequency (RF) measurements; the second is based on utilizing database information to enforce a minimum reuse-distance criterion. In real-world cellular systems, an algorithm belonging to one class or the other has inherent advantages and disadvantages due to the characteristics of the information used to make decisions about channel assignment.

SUMMARY OF THE INVENTION

The present invention is directed to an improved scheme for dynamically assigning channels in cellular telecommunication systems. In one embodiment of the present invention, dynamic channel assignment is based on a hybrid combination of a measurement-based DCA algorithm and a reuse-distance criterion algorithm, such as a Cost-Function-Based DCA (CFBDCA).

According to one embodiment, the MSC generates cost values for cell pairs in the cellular system, wherein each cost value corresponds to a cost of assigning a candidate channel to a first cell in the cellular system, assuming that the candidate channel is already assigned to a second cell in the cellular system and each cost value is based on reuse distances, and the MSC uses the cost values to dynamically control operations in the cellular system. For example, the MSC dynamically selects a channel for a new call and a cell site uses the channel for the new call.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention is directed to a cellular system that relies on a dynamic channel assignment scheme referred to as flexible channel allocation (FLCA). The FLCA scheme is a hybrid algorithm that uses both interference measurements based at the cell sites, referred to as measurement-based DCA (MBDCA), and database information stored at the mobile switching center (MSC), referred to as a reuse-distance criterion algorithm, to find optimal channels for assignment to cellular calls. In one embodiment, the reuse-distance criterion algorithm is a cost-function-based DCA (CFBDCA) scheme.

Measurement-based dynamic channel assignment (MBDCA) schemes, such as the one described in the '986 application, monitor the RF environment and base channel assignment decisions on signal and interference measurements made within the cell coverage area. Channel interference may be defined as the energy level from all other cell sites transmitting at the same channel. In MBDCA, a channel is assigned to a call if the channel satisfies a certain call quality criterion. Because MBDCA can adapt to both traffic and interference, it can perform better in terms of system capacity than DCA based solely on a reuse-distance criterion.

In MBDCA, due to limitations imposed by industry standards and system resources, adequate measurements may not always be available to make optimal channel assignment decisions. This is especially true for the downlink of a cellular system. For example, in IS-136 systems, only mobile units capable of mobile-assisted channel allocation (MACA) or mobile-assisted handoff (MAHO) are able to return measurements on a specified channel list. These measurements may be delayed, infrequent, and of limited accuracy. Also the measurements from one mobile unit may not strictly apply to another mobile unit at a different location within the same cell site. For these reasons, in the real world, sometimes poor quality channels may be assigned to calls if MBDCA alone is used to determine channel selection.

In DCA algorithms based on maintaining a reuse-distance criterion, a channel is assigned to a call only if its reuse on neighbor cells satisfies a specified criterion related to the distance between the cells. Here there is adaptation to traffic in the system. However, there is not much adaptation to interference since the co-channel reuse-distance is fixed.

According to embodiments of the present invention, an MBDCA scheme is combined with a reuse-distance criterion algorithm based on, for example, cost functions. The resulting flexible channel allocation scheme offers the opportunity to overcome the disadvantages of each algorithm operating alone. Such a combined or hybrid algorithm compensates for the limited availability of downlink measurements in MBDCA, yet provides the potential for higher system capacity gains than is available with a reuse-distance criterion algorithm operating alone. One preferred MBDCA scheme is described in detail later in this specification in the section entitled "Interference-Based Dynamic Channel Assignment."

Figure 1:
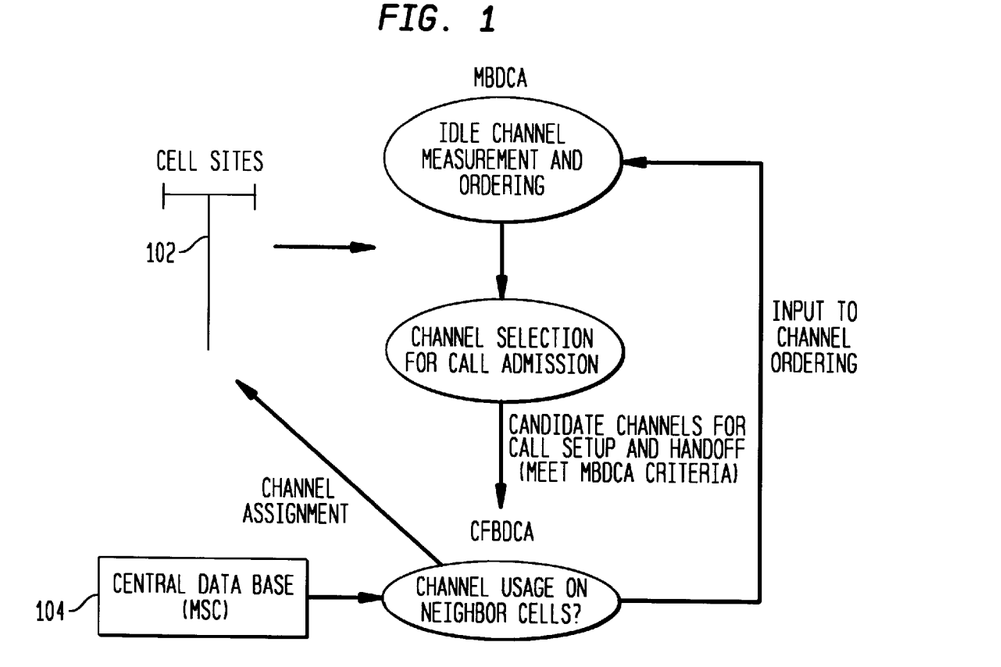
FIG. 1 shows the operation of a hybrid flexible channel allocation (FLCA) algorithm, according to one embodiment of the present invention.

FIG. 1 shows the operation of a hybrid FLCA algorithm, according to one embodiment of the present invention. The hybrid FLCA algorithm has two portions: an MBDCA portion implemented at each cell site 102 and a CFBDCA portion implemented using a central database at the MSC 104. In the MBDCA portion, candidate channels for flexible assignment are ordered based on available uplink and downlink interference measurements. Channels are selected that meet channel interference (C/I) criteria relative to the signal strength for the mobile requesting service. These candidate channels are then passed to the CFBDCA portion, which is a reuse-distance criterion algorithm that operates using a central database. The CFBDCA portion chooses one of the candidate channels for assignment based on how that channel is already being used on adjacent and nearby cells. The CFBDCA portion may also modify the channel candidate list at the cell site based on information on how channels are being used on neighboring cells. For example, the CFBDCA portion may send back to the cell a list of "poor" channels that are heavily used on neighboring cells. Until further instructed by the MSC, the cell will remove these channels from future consideration as candidate channels, independent of any measured channel interference levels.

In the embodiment of FIG. 1, the MBDCA portion is a fully distributed architecture, with cells controlling the selection of channels to be candidates for assignment. Since the CFBDCA portion requires knowledge of neighbor cells, this function is preferably executed in a central location (e.g., in the MSC) to keep message communication to a minimum. At the MSC, only one instance of the database is needed to support the algorithm. An alternative architecture is to distribute the CFBDCA algorithm to a controller that manages several cell sites. However, this would require each controller to calculate a partial-sum cost value for the cells to which it is connected anytime a neighbor cell site sets up a call or performs a handoff. The MSC or a serving cell site controller would assemble the total cost values from the partial costs received from each controller. This alternative would increase cell-site-to-MSC traffic and cause delay in completing call setup and handoff.

Cost Function Based Algorithm for Flexible Channel Assignment

In general, the hybrid FLCA algorithm of the present invention is implemented by combining a measurement-based DCA scheme with a suitable reuse-distance criterion algorithm. In a preferred embodiment of the present invention, however, the reuse-distance criterion algorithm is a particular type of algorithm referred to as a cost-function-based DCA (CFBDCA) algorithm. The CFBDCA portion works in conjunction with the MBDCA portion, primarily to compensate for incomplete and inaccurate signal measurement information in the MBDCA portion. However, in the most general sense, the CFBDCA algorithm can be implemented with or without candidates selected by an MBDCA portion. That is, the CFBDCA algorithm of the present invention can be implemented either in hybrid DCA schemes or in DCA schemes that rely solely on the CFBDCA algorithm.

The CFBDCA algorithm uses a database to ensure that candidate channels (perhaps selected by an MBDCA algorithm) are not in use on too many nearby cells/sectors. When candidate channels are selected by MBDCA, the CFBDCA function helps to compensate for the lack, in some cases, of downlink interference measurements at the location of the mobile.

Figure 2:
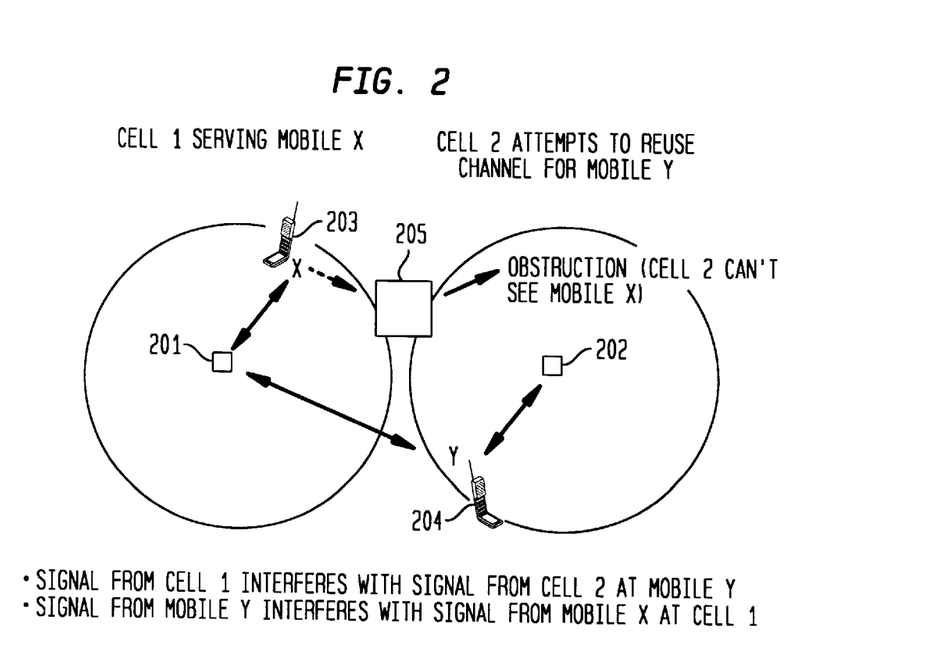
FIG. 2 illustrates the motivation for incorporating a cost-function-based dynamic channel assignment scheme in the hybrid FLCA algorithm.

FIG. 2 illustrates the motivation for incorporating CFBDCA in a joint MBDCA-CFBDCA algorithm. In FIG. 2, Cell 2 (202) is attempting to allocate a channel for mobile Y (204). The interference measured at Cell 2 on the uplink channel being used in Cell 1 (201) by mobile X (203) appears low, because Cell 2 is momentarily obstructed from "seeing" Mobile X which has moved behind an obstruction (205). As such, the channel being used by Cell 1 to serve Mobile X appears to be a low interference channel in the MBDCA portion and may therefore be assigned to Mobile Y by Cell 2 in the absence of the CFBDCA portion. This could result in call dropping for both Mobile X and Mobile Y.

CFBDCA helps to compensate for short-term obstructions, fading, and other real-time environmental fluctuations that prevent a cell configured with MBDCA alone from sensing, through uplink RF measurements, that a particular channel associated with the cell/sector is not suitable for serving a call. CFBDCA also helps compensate for long-term signal propagation conditions in the environment that prevent a cell/sector from sensing, through uplink RF measurements, that a particular channel is not suitable for long-term association to the cell/sector. CFBDCA also helps compensate for inaccurate inference of downlink channel quality from uplink measurements when uplink and downlink RF conditions are not well correlated. In addition, CFBDCA enables the estimation of not only the interference that would be experienced by the call considered for admission, but also the impact of admitting that call on the interference experienced by calls in progress in neighboring cells.

In one embodiment, CFBDCA has (1) a basic execution function that determines whether a candidate channel is acceptable to serve a call, (2) a feedback function that allows CFBDCA to provide the results of cost computations to an interference-based algorithm such as MBDCA, and (3) a maintenance function that allows a service provider to maintain a consistent database, and to assign cost function values and thresholds. These functions may be optionally augmented with additional operations. One such operation, described later in this specification, is the automatic computation of cost values when a new cell is added to the network, neighbor associations are changed within a network, or new RF measurements become available.

Centralized CFBDCA Execution Function

CFBDCA is preferably a centralized algorithm that accepts as input a list of candidate channels that, for example, MBDCA has determined are acceptable for serving a call. In the case of a preferred hybrid FLCA algorithm, MBDCA selects these channels according to uplink and downlink signal strength measurements. The length of the list could vary from a few to many channels depending on the processing power available for CFBDCA computations.

Figure 3:
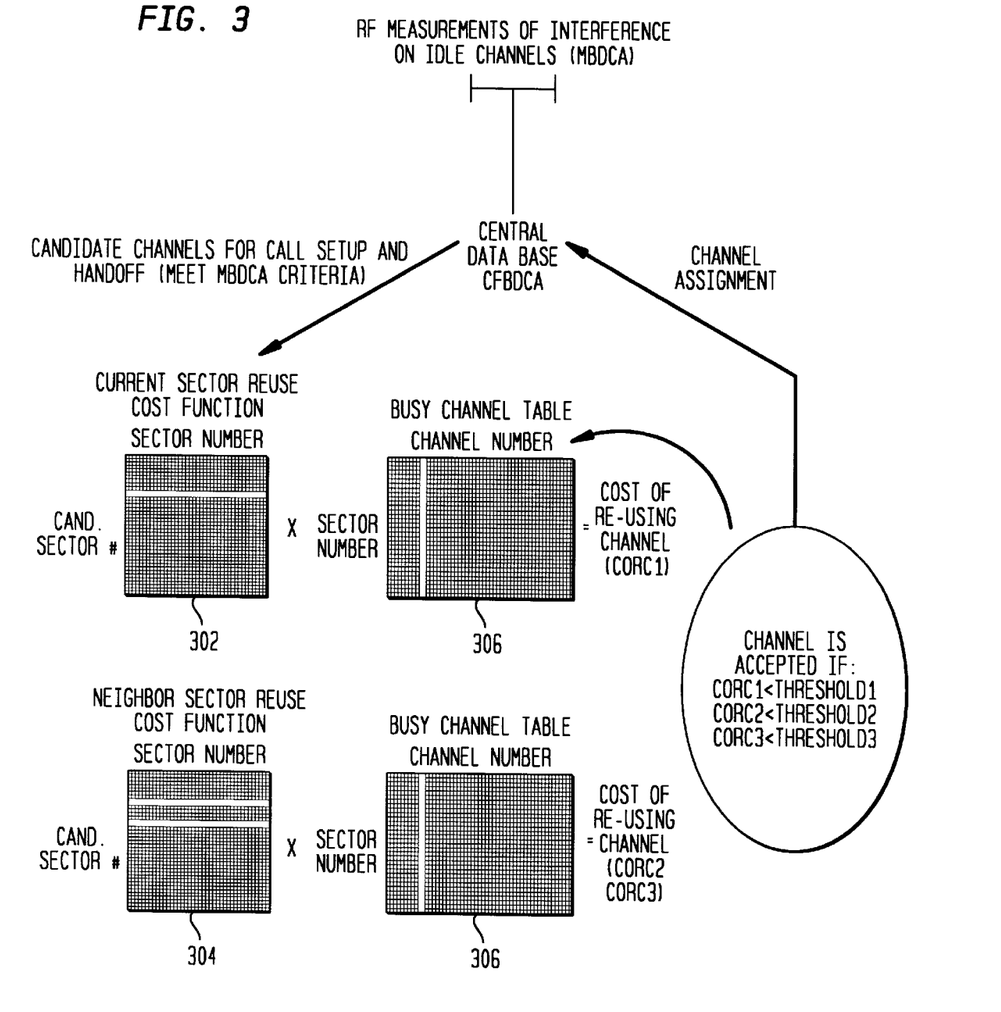
FIG. 3 logically illustrates the CFBDCA execution function, according to one embodiment of the present invention.

FIG. 3 logically illustrates the CFBDCA execution function, according to one embodiment of the present invention. Actual implementation of a CFBDCA algorithm may use a different software architecture depending on available system resources. For example, rather than calculating the cost function from scratch every time a channel needs to be selected, the algorithm may be implemented to opt for permanently maintaining the correct cost function values, and update them every time a channel is allocated or de-allocated. The CFBDCA execution function of FIG. 3 has the following phases:

Reception of Candidate Channels from MBDCA (or other sources);

Cost of Reusing Channel (CORC) Calculations; and

Channel Selection, Busy Channel Table Update, and Channel Assignment.

Execution of the CFBDCA algorithm starts when it receives, for each candidate cell/sector, a list of candidate channels for call setup or handoff. CORC calculations are vector multiplications of entries from tables stored in a central database. Cost tables contain a cost for every cell/sector pair that may interfere with each other. Two such tables are shown in FIG. 3.

In the Current Sector Reuse Cost Table 302 of FIG. 3, each entry is the cost associated with using a channel on a candidate sector indicated by the row, assuming that a second sector indicated by the column is already using the same channel. The cost may be related to the power from the second sector that the candidate sector expects to receive when both are using the same channel. This table is preferably static and is updated only when a new sector is added or removed from the system.

In the Neighbor Sector Reuse Cost Table 304 of FIG. 3, each entry is the cost to a nearby sector, indicated by the row, of the candidate sector, indicated by the column, using the same channel. This cost may be related to the power from the candidate sector that the nearby sector expects to receive. This table is also preferably static and is updated only when a new sector is added or removed from the system. In practice, the cost values in the Neighbor Sector Reuse Cost Table may be identical to those in the Current Sector Reuse Cost Table, in which case only one cost table needs to be maintained in the MSC.

The cost tables 302 and 304 are used with a third table, the Busy Channel Table 306, for calculating various Cost Of Reusing Channel (CORC) values. This Busy Channel Table keeps track of which cells are using particular channels at any point in time and is preferably updated when a new channel is allocated to or deallocated from a call. The Busy Channel Table contains a "1" where a channel (i.e., column) is being used on an indicated cell/sector (i.e., row); otherwise, it contains a "0".

For each candidate channel (perhaps received from MBDCA), the (1×N) vector from the Current Sector Reuse Cost Table for the candidate sector is multiplied by the (N×1) vector for the candidate channel in the Busy Channel Table. The result of the vector product is equivalent to a sum of the cost table entries for those sectors where the candidate channel is currently already in use. This value is the Cost of Re-using Channel value CORC1 for the candidate sector and the candidate channel. It represents the cost to the candidate sector of using the channel, given that the channel is already in use on the nearby sectors indicated by the Busy Channel Table. The channel is acceptable only if CORC1 is less than a specified threshold value.

Similarly, for each candidate channel, and for each sector nearby the candidate sector, the (1×N) vector from the Neighbor Sector Reuse Cost Table is multiplied by the (N×1) vector for the candidate channel in the Busy Channel Table. For this calculation, the Busy Channel Table is temporarily updated to assume that the candidate channel is already in use on the candidate sector. The result of the vector product (CORC2, CORC3, etc.) is equivalent to a sum of the Neighbor Sector Reuse Cost Table entries for the sectors where the candidate channel is in use, including the candidate sector. Each of these CORC values represents the cost to a nearby sector of using the candidate channel on the candidate sector, plus the cost across all other sectors where the channel is already in use. The candidate channel is acceptable only if all of these CORC values (i.e., CORC2, CORC3, etc.) are less than specified threshold values.

A candidate channel is considered acceptable if all CORC values are less than the specified threshold values. The thresholds may be changeable by the service provider to allow tuning of the cost function algorithm. When a new channel is selected for use, the Busy Channel Table is updated and the channel assignment is sent to the cell. Similarly, when all of the time slots in a channel have been deallocated and the channel is no longer in use on a cell, the Busy Channel Table is updated appropriately. In a preferred embodiment, time slots in an already assigned channel are filled for new calls in a particular cell site, before a new channel is assigned to that cell site.

CFBDCA Feedback Function

CFBDCA can provide feedback to algorithms such as MBDCA that select candidate channels for CFBDCA. Candidate channels that regularly fail the CFBDCA cost function tests need not appear on the candidate lists provided, for example, by MBDCA. Feedback is provided by a message (sent, for example, from the central database in the MSC to a cell executing MBDCA) indicating channels to be ignored (i.e., removed or de-prioritized from consideration for specific sectors). There are several alternatives for implementing this feedback. They include:

A message can be sent to the cell indicating that channels be removed or de-prioritized for consideration as candidate channels, where CORC1 is greater than a special threshold with a value significantly greater than the threshold value used for accepting channels for assignment.

The CORC1 values for channels on each sector can be averaged over time. Periodically, a list is sent to each sector indicating the channels with the worst CORC1 values. These channels are then removed or de-prioritized for consideration for call assignment by the cell.

Figure 4:
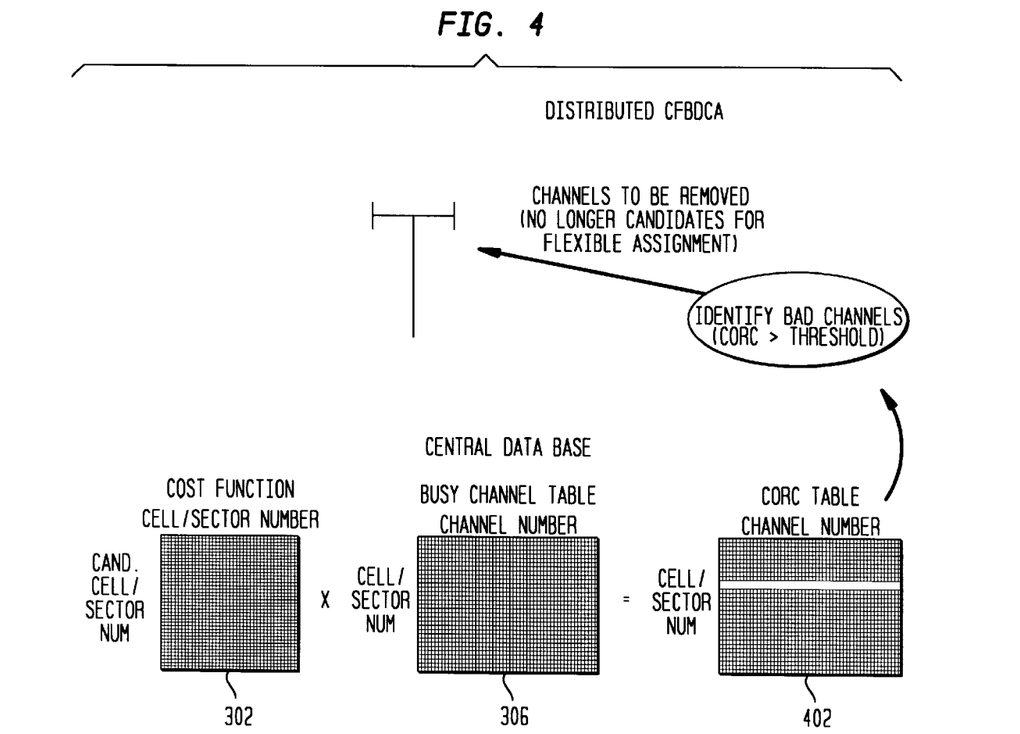
FIG. 4 illustrates the CFBDCA feedback function, according to one embodiment of the present invention.

As shown in FIG. 4, the MSC periodically updates a CORC Table 402 that is constructed by multiplying the (N×N) Current Sector Reuse Cost Table 302 of FIG. 3 with the (N×M) Busy Channel Table 306 of FIG. 3. The costs of all the channels for the nth cell are stored in the nth row of the CORC table. The MSC then sends a list of channels whose costs exceed a specified threshold value to the corresponding cell to help the cell exclude/prioritize the channels for the cell.

A time-averaged long-term CORC table can be maintained in the MSC by performing a moving average using the updated values in the CORC table. The long-term costs of the channels for the nth sector are stored in the nth row in the long-term CORC table. The MSC then sends to a cell a list of channels whose long-term costs exceed a specified threshold value to help the cell exclude/prioritize the channels for the cell.

All these alternatives result in reducing the number of poor channel candidates provided as the input to the CFBDCA process.

CFBDCA Maintenance Functions

Two maintenance functions are provided to ensure proper CFBDCA operation. The Parameter Override function allows the service provider to modify parameters that are automatically populated by the CFBDCA algorithm, and the Busy Channel Table Audit function assures that the channels designated as "busy" in the Busy Channel Table are consistent with channels in use on the corresponding cells/sectors. These functions are described further in the following subsections.

Parameter Override by Service Provider

The Parameter Override function is a recognition that the automated initialization functions will not always assign optimal cost values and CORC threshold values to cells. Cell pairs that are in closer proximity than is evident from neighbor relationships may have their costs increased. Similarly, cell pairs that are further away than is evident from neighbor relationships may have their costs decreased. This function allows the service provider to override defaults and provide the following:

The default cost value for each tier used to generate cost values automatically for all cell pairs (as described later in this specification in the section entitled "Automated Cost Value Computation") may be overridden by the service provider.

The default cost assigned for each cell-to-cell relationship in the cost tables (302 and 304 of FIG. 3) may be overridden by the service provider. To accommodate cells of different sizes, the cost associated with Cell 1 reusing a channel being used by Cell 2 may be specified independently from the cost associated with Cell 2 reusing a channel being used by Cell 1. In other words, the cost value stored in element (i,j) of a cost table can be specified to be different from the cost value stored in element (j,i) of the same cost table.

The default CORC threshold values may be overridden by the service provider. The service provider may also add or delete individual cells/sectors to and from the cost tables. This allows for specification of interfering cells that are not detected by automated neighbor association.

Busy Channel Table Audit

The Busy Channel Table Audit function polls cells to determine which channels are currently in use. The results from polling cells are compared with entries in the Busy Channel Table (306 in FIG. 3). Any table entry that does not correspond to the correct state of a channel on a cell/sector is corrected.

Automated Cost Value Computation

An algorithm, such as the flexible channel allocation algorithm described earlier, that uses a hybrid channel-assignment scheme relying on both RF measurements and database information can provide benefits not available using an algorithm based on only one of these sets of information. A database algorithm, such as the cost-function-based DCA algorithm described earlier, needs accurate cost values to produce satisfactory performance.

One method of populating costs in a CFBDCA algorithm is to acquire, at a cell site, signal energy measurements that indicate the level of interference expected from neighboring cells. A second method, which relieves the cellular system operator of obtaining these RF measurements, is to calculate default cost values based on neighbor associations currently available in a cellular system database. Yet another method relies on modeling the RF environment.

Cost Function Computation Using Neighbor Association

The cost tables in a CFBDCA algorithm (e.g., 302 and 304) may be automatically populated in a central database based on existing mobile-assisted handoff (MAHO) or digital control channel (DCCH) reselection neighbor information, and cost values associated with each neighbor tier. It is expected that implementation in a cellular system would in addition allow the service provider to override individual entries in the cost tables by entering cost values directly for specific cell pairs. According to this approach, the default cost tables are generated by determining which cells or sectors are first-tier, second-tier, and third-tier neighbors of a cell. This information can be obtained from MAHO neighbor lists or DCCH reselection lists.

The neighbor of a cell that is being configured is a cell whose coverage area abuts or overlaps with the coverage area of the cell being configured and is called a first-tier neighbor. The neighbor of a first-tier neighbor that is not another first-tier neighbor of the cell being configured is a second-tier neighbor. The neighbor of a second-tier neighbor that is not already classified as a first-tier or second-tier neighbor of the cell being configured is a third-tier neighbor. And so forth.

Figure 5:
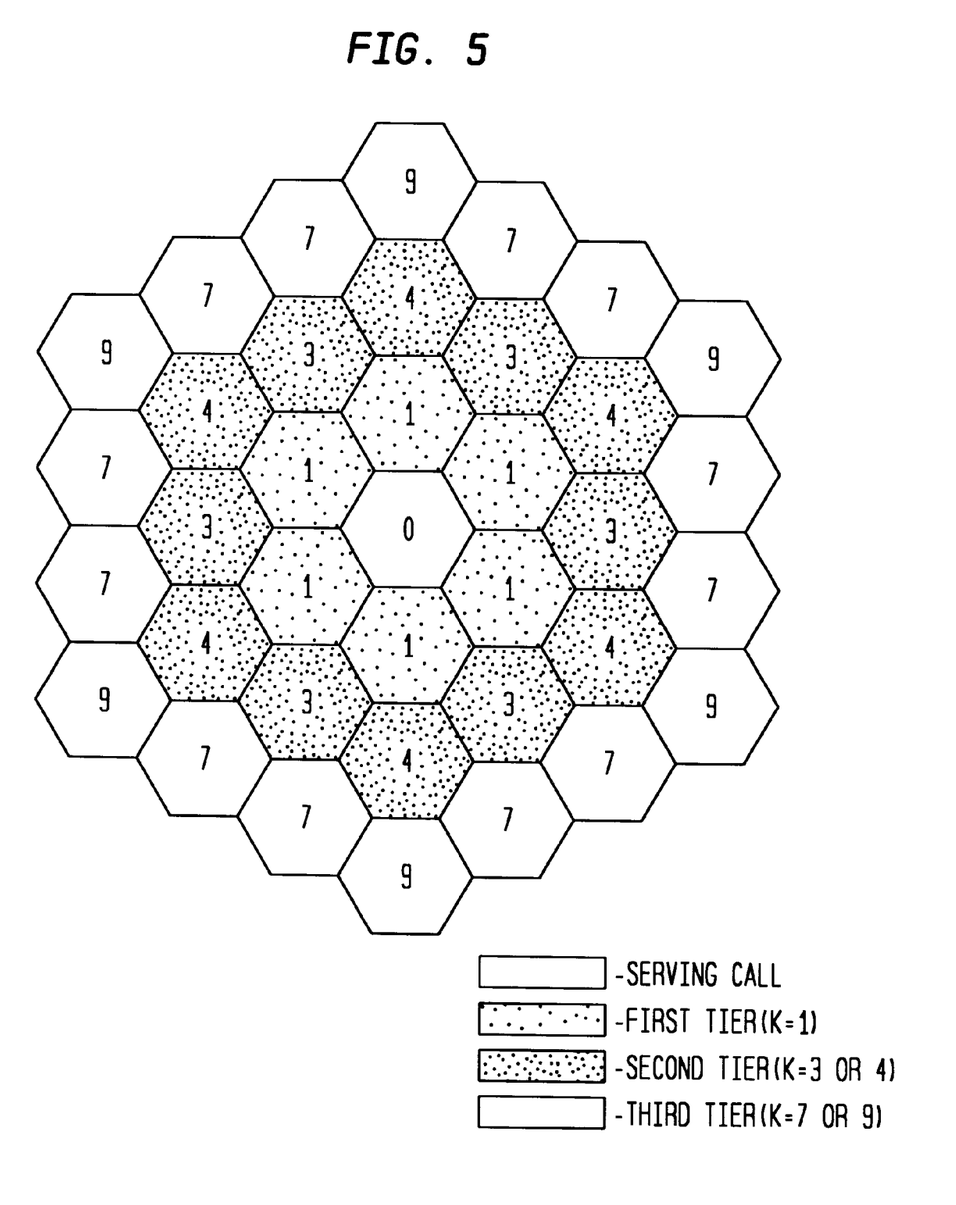
FIG. 5 shows the results of neighbor identification for the cell at the center of an ideal array of cell sites in which each cell has the same radius and the cells are located in a perfect hexagonal pattern.

FIG. 5 shows the results of neighbor identification for the cell at the center of an ideal array of cell sites in which each cell has the same radius and the cells are located in a perfect hexagonal pattern. Although the cell sites are depicted in FIG. 5 as hexagons, they are actually overlapping circles. As indicated in FIG. 5, first-tier neighbors correspond to K=1, second-tier neighbors to K=3 and 4, and third-tier neighbors to K=7 and 9, where the reuse distance K is defined as $D^2/3R^2$, where D is the distance between the centers of two cells and R is the cell radius. For the present example, cells more distant than K=9 are assumed not to interfere with the serving cell; however, the algorithm may be extended to cells more distant than K=9, if needed. Each cell in FIG. 5 is labeled with the reuse distance K from the center cell (K=0).

When a cell is added to the system, an initialization function determines first- through third-tier neighbors. Cost values are assigned automatically to all neighbors according to their tiers. Other factors, such as the transmit power associated with a neighbor, may also be used in the calculation of the default cost values. Cost values are preferably assigned to all neighbor cells independent of whether or not they support DCA. A cost table is updated by adding a row and column for the new cell. The column provides the reciprocal cost relationship with neighbor cells.

The default cost values for each cell pair represent the power that a mobile on one cell should expect to see from the other cell. Table I illustrates how the default cost may be set when the attenuation is assumed to be 38 dB/decade and all cells have equal transmit power. Table I shows the reuse distance K, the tier of a neighbor with that K, the corresponding distance D between cells divided by the cell radius R, the average dB attenuation that a cell would expect to see from a single neighbor, the average power attenuation from the neighbor, and a cost that is an average of the average power attenuations across each tier, weighted by the number of neighbors in that tier with the same reuse distance. Table I includes entries for fourth-tier (K=12, 13, and 16) neighbors. In most cases, the power received from channels in use on these cells is negligible.

TABLE I

Example of Default Cost Function Values

| K | TIER | D/R | dB Attenuation from Neighbor | Average Power Attenuation | Cost (= Tier Average) |
|---|---|---|---|---|---|
| 1 | 1 | 1.732 | −9.065 | 0.124014 | 0.124014 |
| 3 | 2 | 3.000 | −18.131 | 0.015379 | 0.012141 |
| 4 | 2 | 3.464 | −20.504 | 0.008903 | |
| 7 | 3 | 4.583 | −25.122 | 0.003075 | 0.002685 |
| 9 | 3 | 5.196 | −27.196 | 0.001907 | |
| 12 | 4 | 6.000 | −29.570 | 0.001104 | 0.00091 |
| 13 | 4 | 6.245 | −30.230 | 0.000948 | |
| 16 | 4 | 6.928 | −31.944 | 0.000639 | |

The entries listed in Table I represent the cost associated with using a channel on a cell, given that the channel is already in use on a nearby cell, when all cells have equal transmit power. The cost values provided from this algorithm to the CFBDCA cost tables are preferably scaled by the transmit power of each cell.

It should be noted that the cost values generated using neighbor association can be used in contexts other than as the entries for cost tables used in CFBDCA algorithms. For example, they can be used as input to an algorithm for automated selection and assignment of control channels to cell sites (e.g., Digital and Analog Control Channels in IS-136 based cellular systems). Alternatively, the cost values may be used as inputs to cell deployment modeling tools to determine where additional cells are needed, and what coverage proposed additional cells would provide.

Cost Function Computation Using RF Measurements

Since individual cost values represent the power expected to be received on a cell when a channel is in use on another cell, the cost tables could be populated based on actual RF measurements, when these are available. The downlink measurements may be made either during system initialization (no service) or during system operation (in service).

The cost tables may be populated when the system is being initialized and not in service. When the system is not in service, the cost table may be filled one entry at a time by turning on a channel at the appropriate interfering cell and making measurements on that channel in the given nearby cell. A whole row in the cost table may be filled at one time, if different orthogonal channels are turned on, one in each interfering cell, and these channels are measured at the given cell site.

If the system is already in service, then entries in the cost table may be approximated by measuring downlink beacon channels from neighbor cells. This process requires that neighbor cells and their beacon channels be identified, for example, by operator specification, to cells being configured. This method may not be as accurate as the method used at system initialization, because the energy from a neighbor beacon channel may be partially corrupted by a co-channel beacon on another neighbor cell. However, this method does provide a mechanism to automatically populate the cost table for a new cell in an active system without disturbing system operation or service.

Measurements to support cost table population may be made in two different ways. One method is to have cell-site radios make downlink measurements. The other method is to have radios make measurements at strategic locations in the cell and communicate them back to the cell site. In the latter case, measurements may be made by mobile units and reported to the cell using an air interface protocol such as IS-136, or measurements may be made by special monitors that communicate through a wired link to the cell.

Cost Function Population Using RF Modeling

A third alternative for obtaining cost values for use in a CFBDCA algorithm is to use the results from an RF modeling tool. A modeling tool may utilize terrain data and propagation decay associated with a particular service area to obtain accurate estimates of RF energy received on a cell or sector from other cells or sectors in the service area. These estimates may be scaled appropriately and used as cost values for each sector or cell. Updates of cost values obtained in this way can be made either for idle (new) cells or for cells that are already active on calls.

Those skilled in the art will understand that any two or all three of these different methods can be combined to generate cost values for use in a CFBDCA algorithm. For example, the costs obtained for a particular cell pair using two or more different methods can be averaged to generate the cost value used in the actual CFBDCA algorithm. There are no ideal or optimal values for the cost coefficients in any absolute terms. Larger cost coefficients lead to more conservative reuse, lower interference and thus better voice quality, and less stringent admission and thus higher system capacity. Thus, the cost coefficients allow service providers to fine tune the trade-off between voice quality and system capacity. If the cost coefficients are set too conservatively, then the potential capacity gains from the measurement-based admission control may be forfeited. If the cost coefficients are set too aggressively, then the voice quality may be poor and excessive dropping may occur. In particular, when cost coefficients are set aggressively, information on excessive dropping may be used as feedback to adjust the cost values.

Interference-Based Dynamic Channel Assignment

This section and the following sub-sections describe an interference-based dynamic channel assignment (IBDCA) algorithm that is one preferred MBDCA scheme of the present invention. This IBDCA algorithm is also described in the '986 application.

Figure 6:
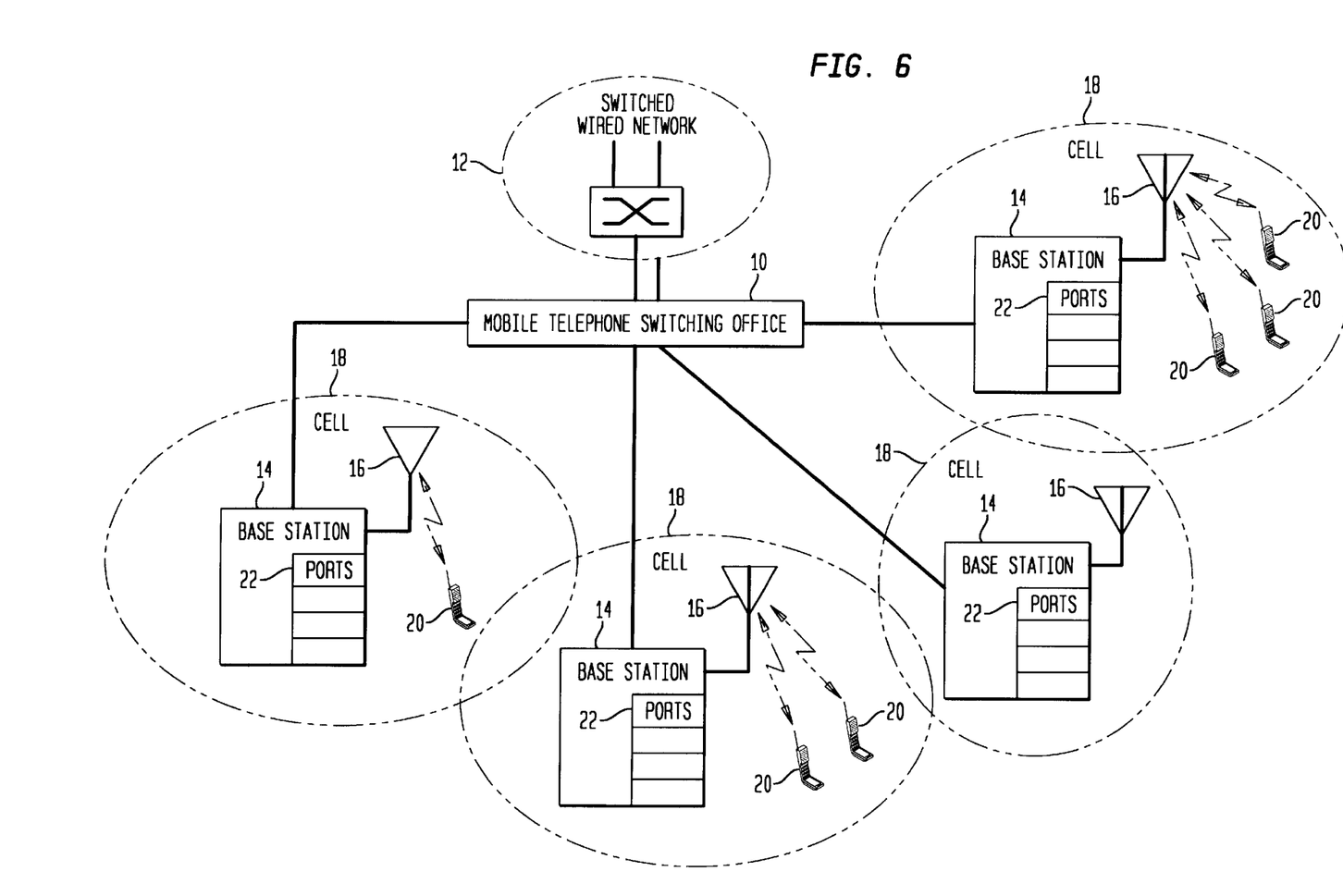
FIG. 6 is a block diagram of a wireless network.

FIG. 6 is a block diagram of a wireless network. A Mobile Telephone Switching Office (MTSO) 10, also known as a Mobile Switching Center (MSC), provides for switching calls between the cellular network and the switched wired network 12. The MTSO 10 controls the entire operation of a cellular system, setting up and monitoring all cellular calls, and tracking the location of all cellular-equipped vehicles traveling in the system, arranging handoffs, and providing billing information. The MTSO 10 is connected to a plurality of cells 14. The cell 14 is the fixed transceiver in the wireless network, which is coupled through a radio port to a cellular antenna 16. The typical cell 14 comprises multiple radio transceiver ports 22. Radio transceiver ports 22 are assigned to a channel. The geographical area for which a cell 14 acts as the gateway is called its cell 18, the various cell 14 nodes are distributed at suitable locations. A mobile unit 20 communicates with a cell 14 within a cell 18 through an assigned channel pair consisting of an uplink frequency and a downlink frequency.

In the interference-based DCA scheme of the present invention, besides including adaptation to traffic, radio link, interference, and shadow fading variations, there is also incorporated adaptation to terrain features, fixed spectrum, system deployment, and system growth. The IBDCA scheme handles two time scales of interference adaptation, which are slow long-term variations (arising from terrain features, system deployment, fixed spectrum, etc.) and fast short-term variations (arising from traffic patterns, radio link, interference, shadow fading, etc.) Further, the IBDCA scheme is totally distributed on a per cell/sector basis.

Figure 7:
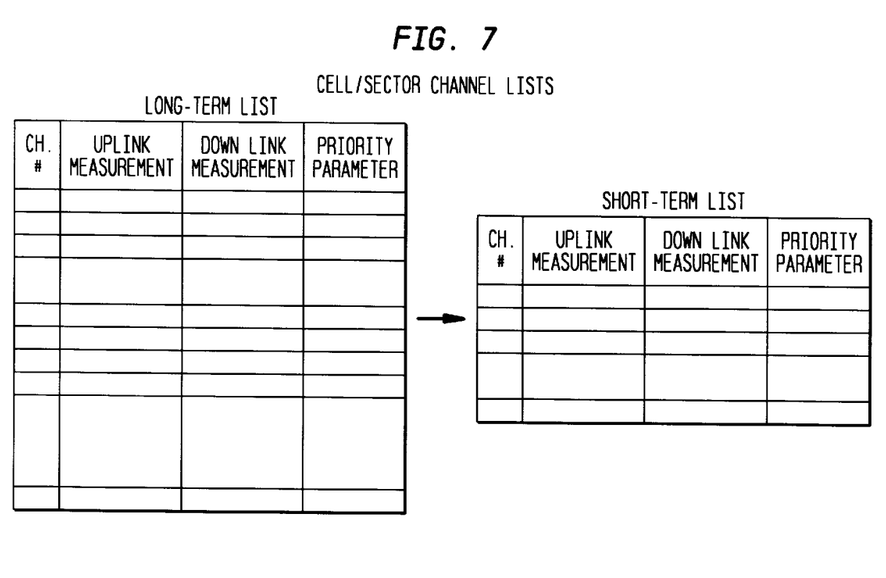
FIG. 7 is a diagrammatic representation of the cell/sector channel lists.

Referring now to FIG. 7, there is shown a diagrammatic representation of the cell/sector channel lists. The IBDCA scheme utilizes interference measurements made on the uplink and downlink. The scheme essentially has two concurrent processes, namely, long-term and short-term, which order the channels for each cell 18 (or sector) based on interference measurements made in the cell 18 (or sector). This interference-based DCA scheme is distributed in the sense that each cell 18 (or sector) has a long-term and short-term process. The long-term process orders the entire spectrum for each cell based on a moving average of interference measurements forming a long-term list for both the uplink channel assignments and the downlink channel assignments. Since a moving average value is used by the long-term process, it adapts to slow (or long-term) variations in system characteristics, such as terrain features, system deployment, system growth, and fixed spectrum. The short-term process orders only a certain number of channels that are the best as deemed by the long-term process which form the short-term list. The short-term process uses a function of near instantaneous interference measurements to order channels and hence adapts to fast (or short-term) variations in the system, such as traffic pattern, radio link, interference, and shadow fading. The two processes together groom channels for each cell (or sector) and support a robust dynamic channel assignment procedure.

System and Model Notation

TDMA and FDMA systems are also referred to as digital and analog systems, respectively. For a base station in the network, the Carrier to Interference Ratios (CIRs) at the receiver for the $i^{th}$ channel pair on the uplink and downlink are denoted by $\gamma_U^{(i)}$ and $\gamma_D^{(i)}$, respectively. Let the minimum acceptable values for CIRs on the uplink and downlink be denoted by $\Gamma_U$ and $\Gamma_D$, respectively. The values of $\Gamma_U$ and $\Gamma_D$ are determined by the types of receivers in the system and typically take values in the range 11–25 dB. The received signal strengths (RSSs) on the $i^{th}$ channel pair on the uplink and downlink are denoted by $RSS_U^{(i)}$ and $RSS_D^{(i)}$, respectively, and the corresponding moving average RSS (MARSS) values are denoted by $MARSS_U^{(i)}$ and $MARSS_D^{(i)}$, respectively. Interference thresholds on the uplink and downlink are denoted by $I_U$ and $I_D$, respectively. The values of $I_U$ and $I_D$ are given by:

$$I_U = G_A P_U G_B / \Gamma_U \qquad (1)$$

and $$I_D = G_A P_D G_B / \Gamma_D \qquad (2)$$

where $G_A$ is a constant that includes antenna gains, $G_B$ is the worst-case link gain between the center and boundary of the cell, and $P_U$ and $P_D$ are the transmitted powers on the uplink and downlink, respectively.

The IBDCA scheme consists of signal measurement, channel ordering, call admission, channel assignment, call maintenance, call handoff, and system/cell startup procedures. The IBDCA scheme makes signal measurements in each cell 18 (or sector) on the uplink and the downlink (downlink measurement capability exists only in digital systems). Based on the measurements on the uplink and downlink, the channels are ordered by a long-term and a short-term process, in each cell 18 (or sector). When a call arrives in a cell 18, certain admission and blocking criteria are applied to determine if the call may be admitted. A set of candidate channels are selected based on certain channel assignment criteria. Selected channels that meet the assignment criteria may be sent to a reuse distance criteria algorithm, such as CFBDCA for further screening and final channel selection. Once the call is set up on the assigned channel, the call is monitored and may be handed over to another channel if necessary to maintain the quality of communication.

Signal Measurement and Estimates

Two types of estimates are made from signal measurements: (1) received signal strength (RSS) and (2) carrier to interference ratio (CIR). RSS estimates are used in channel ordering procedures. CIR estimates are used in call admission, handoff, and channel assignment procedures.

RSS estimates are made only on channels that are not currently active in the cell 18 (or sector). A pair of frequencies are assigned to a call: one to provide the uplink (mobile unit 20 to cell 14) and the other to provide the downlink (cell 14 to mobile unit 20). This pairing of frequencies is predefined; the pair is called a channel. So it is desirable to obtain measurements and make channel assignment decisions not only on the uplink but also on the downlink. In current systems, the time slots are not synchronized amongst cells and the TDMA carrier on the downlink is off only when all time slots are idle. Also, in current IS-136 TDMA systems, downlink information on interference and signal level is often not available. In these cases, a set of candidate channels that meet uplink channel quality criteria may be assembled and passed to a reuse distance criteria algorithm such as CFBDCA for further screening and final channel selection.

When the RSS measurement process is on a frequency basis, the measurement and ordering in the IBDCA scheme may be on a frequency basis. In this case, the RSS measurement period spans a full cycle of time slots on the carrier. If the RSS measurement process is on a time-slot basis, then the measurement, ordering, and channel assignment in the IBDCA scheme may be on a time-slot basis. Thus, there may be four combinations: (1) the long-term process being frequency based and the short-term process being frequency based; (2) the long-term process being frequency based and the short-term being time-slot based; (3) the long-term process being time-slot based and the short-term process being frequency based; (4) the long-term process being time-slot based and the short-term process being time-slot based. One of these four combinations may be chosen in the IBDCA algorithm to suit the particular system under consideration.

A radio unit that resides at the cell 14 is capable of making RSSI measurements on the uplink in both digital and analog modes. As mentioned before, if the RSS measurement process is on a frequency basis, then the measurement period for each RSS estimate on the uplink spans a full cycle of time slots on the frequency, although it can be longer if necessary. In order to compute each RSS estimate, a number of RSSI samples are to be taken uniformly over this measurement period. The RSS estimate is then computed as a function of those RSSI samples. The advantage of the above scheme for signal strength measurement is that it is totally distributed; that is, there is no need for any central coordination to check frequency usage to identify and discard measurements that fall on idle time slots of active frequencies. However, this comes with the cost of extra processing and delay in the signal measurement because of the measurement period of length equal to at least a full cycle of time slots on the carrier.

In the downlink, the carrier is turned off only when all time slots on the carrier are idle. Due to this fact, RSSI samples falling in idle time slots of the frequency will also reflect the interference from the frequency. So the measurement period for the RSS estimate on the downlink does not have to span a full cycle of time slots on the frequency. Mobile units 20 in the digital mode are capable of making RSSI measurements (on a set of channels specified by the base) both during active and non-active modes. During an active mode (i.e., with an on-going call), TDMA mobile units 20 can make RSSI measurements on a limited number of channels as part of a procedure called Mobile Assisted HandOff (MAHO). When IS-136 TDMA mobile units are in a non-active mode (i.e., with no active call), they can make RSSI measurements in a procedure called Mobile Assisted Channel Assignment (MACA). (IS-136 TDMA is the most recent revision of TDMA.) Also, in some cases, special radio units at the cell 14 may be used to make RSSI measurements on the downlink frequencies.

In some cases, an estimate of expected CIR on the uplink before call initiation can be made by dividing the RSS estimate measured at the base on the Reverse Control CHannel (RCCH) with the instantaneous uplink RSS value of the channel under consideration.

For IS-136 mobiles that support MACA, the CIR on the downlink can be estimated before call initiation by dividing the RSS estimate measured at the base on the RCCH (with appropriate adjustment factors for the radio link since it is an approximation of the downlink signal strength) with the RSSI value measured on the channel under consideration at the mobile unit 20 and reported to the cell 14 as a MACA report.

In cases where "C" or "I" information is not available, a portion of the "Channel Assignment" criteria may be used to generate a set of candidate channels that may then be further screened by CFBDCA.

Channel Ordering

The channel ordering in each cell is done by two processes: a long-term process and a short-term process. The long-term process, shown in FIG. 8, adapts to the slow (long-term) variations in the system, such as terrain features, system deployment, system growth, and fixed spectrum. On the other hand, the short-term process, shown in FIG. 9, adapts to fast (short-term) variations in the system, such as traffic, radio link, interference, and shadow fading. As described earlier, the RSS measurements for both the long-term and short-term processes in a cell 18 are made on channels that are not active at that time in the cell 18.

Figure 8:
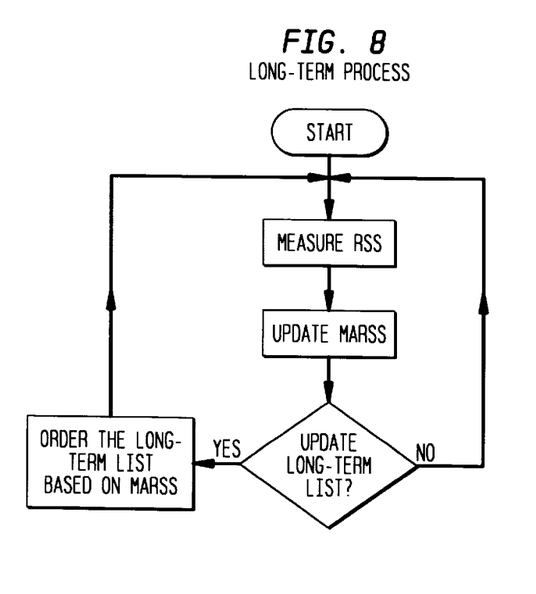
FIG. 8 shows the long-term process of channel ordering.

The long-term process, shown in FIG. 8, orders, for the cell under consideration, the entire spectrum based on a moving average RSS value. The channels are arranged in the order of increasing moving average RSS value. It may be necessary to maintain separate moving averages for different times corresponding to various levels of traffic intensities. For example, traffic during nights is different from traffic during days and separate moving averages may be needed for nights and days. A moving average may need to be maintained for each hour, or it may be sufficient to maintain one moving average value that is updated only during busy hours and use this value always to order channels. Let k be the index of the time instants at which RSS measurements are made. That is, $RSS_U^{(i)}(k)$ and $RSS_D^{(i)}(k)$ are the RSS measurements made at the $k^{th}$ time instant on the $i^{th}$ channel for the uplink and downlink, respectively. Let $W_U(.)$ and $W_D(.)$ denote weights for the uplink and downlink, respectively, and whose values are functions of $RSS_U^{(i)}(k)$ and $RSS_D^{(i)}(k)$, respectively. The weights are interference-penalty functions of the RSS values. That is, the weights are to be adjusted so that moving averages decrease at a required rate when the interference (RSS) is low and increase at a required rate when the interference (RSS) is high. The expressions for moving averages for the uplink and downlink are $$MARSS_U^{(i)}(k) = \min\left\{MAXMA_U, \frac{1}{K}\sum_{l=0}^{K-1} W_U\left(RSS_U^{(i)}(k-l)\right)\right\} \quad (3)$$

and $$MARSS_D^{(i)}(k) = \min\left\{MAXMA_D, \frac{1}{K}\sum_{l=0}^{K-1} W_D\left(RSS_D^{(i)}(k-l)\right)\right\} \quad (4)$$

respectively, where K denotes the length of the moving average window, and $MAXMA_U$ and $MAXMA_D$ are the maximum values the moving averages can take on the uplink and downlink, respectively.

Figure 9:
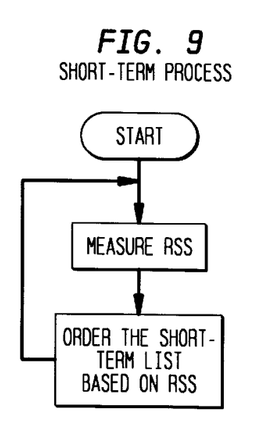
FIG. 9 shows the short-term process of channel ordering.

The short-term process, shown in FIG. 9, orders only a certain number $n_S$ of the top-most or best channels for that cell as deemed by the ordering of the long-term process, shown in FIG. 8. Note that the channels in the short-term list (for uplink and downlink) of length $n_S$ should satisfy $MARSS_U^{(i)} \leq I_U$ for the uplink and $MARSS_D^{(i)} \leq I_D$ for the downlink for i=1 to $n_S$, if the channels are to be usable all the way to the boundary of the cell 18. It may be desirable to enforce this condition in the case of cellular or Personal Communication Services (PCS) systems with high mobility. In fixed cellular or PCS systems where the mobility is low, this condition may not be desirable in the interest of achieving high capacity. The long-term process thus reduces the burden on the short-term process in measuring channels. In the short-term process, channels are arranged in the order of increasing RSS estimates. The short-term process thus provides the cell with the best channels (i.e., the ordered short-term list) for the channel assignment procedure.

The same locate receivers (receivers measuring RSS) can serve both short-term and long-term processes. The first priority in measurements is given to the short-term process. However, it should be noted that the RSS measurement made for the short-term process can also be used by the long-term process in the moving average for the channel under consideration. The remaining capacity of the locate receivers after serving the short-term process can be used to make measurements for the long-term process.

Referring back to FIG. 7, each cell/sector has the entire spectrum (long-term lists for uplink and downlink) ordered by the long-term process and the short-term list ordered by the short-term process.

When used, the Auto-Tune Combiners (ATC) at cell sites take several seconds in tuning to new channels and it may be desirable to continually tune the radios and ATCs to the current best channel(s) according to the short-term ordering. In the interest of not having the ATCs switching channels too often, a hysteresis factor may be introduced (i.e., the difference in the instantaneous RSS values of the best and next-best channels should be above a hysteresis threshold before a switch is made).

Call Admission and Blocking

A call is blocked in a cell 18 if all radio ports 22 at the cell site are busy. If the call is not blocked (i.e., a radio port 22 is available to serve the call), then the call is admitted based on the following criterion. Let the number of channels in the short-term list be denoted by $n_S$.

A TDMA call is admitted if there exists a channel i such that:

$$\gamma_U^{(i)} \geq \Gamma_U + \Delta\Gamma_U \text{ and } \gamma_D^{(i)} \geq \Gamma_D + \Delta\Gamma_D, \ 1 \leq i \leq n_S, \quad (5)$$

where $\Delta\Gamma_U$ and $\Delta\Gamma_D$ are extra margins that are introduced to control system performance. Increasing these margins will increase blocking and decrease dropping. So the margins give the operator "soft" control on blocking and dropping in the system.

An analog call is admitted if there exists a channel i such that:

$$\gamma_U^{(i)} \geq \Gamma_U + \Delta\Gamma_U, \ 1 \leq i \leq n_S. \quad (6)$$

Channel Selection

Let the number of channels in the short-term list that allow the call to be admitted based on the admission criterion be denoted by $n_S^o$. If the call is admitted, the best channels to be assigned to the call are determined according to the following criterion. For a TDMA call, select an idle slot if available on an active frequency; otherwise, select a slot on the $k^{th}$ channel such that:

$$\min\{\gamma_U^{(k)}, \gamma_D^{(k)}\} = \max\{\min\{\gamma_U^{(i)}, \gamma_D^{(i)}\}\}_{i=1}^{n_S^o}$$

For an analog call, assign the $k^{th}$ channel if:

$$\gamma_U^{(i)} = \max\{\gamma_U^{(i)}\}_{i=1}^{n_S^o}.$$

When IBDCA is to provide channels to CFBDCA, a set of "N" channels may be selected for further screening in CFBDCA.

Before call setup on selected channels, a final instantaneous RSS measurement is made on the chosen channel and the admission criterion of the previous section is applied.

Call Maintenance

The existing handoff procedures based on call quality apply. However, handoff operating with the IBDCA scheme could use C/I measurements if available in addition to those of BER and hence can potentially offer better performance.

System and Cell Startup

When the entire system is started up and there is no fixed spectrum in use, all the channels in the long-term and short-term list will occupy the same position in all cells. So, as new calls come into the system, they take any arbitrary channels (e.g., according to channel sequence number or as specified by operator) with a check made at the MSC to avoid instantaneous collision in channel assignment. These initial channel assignments will reflect in the long-term measurements in the system. The long-term ordering in each cell 18 will start this way and evolve with time adapting to system characteristics.

In the case of cells 18 that use ATCs (auto-tune combiners), an algorithm for initial channel selections (until the long-term list evolves to produce the short-term list of preferred channels for the cell under consideration) is as follows:

(1) Start IBDCA
(2) first_channel=[(CS number * #sectors/cell)+sector+1] modulus #channels/application+1
(3) old_channel=first_channel
(where
if omni cell, sector=0,
if alpha sector, sector=0, if beta sector, sector=1,
if gamma sector, sector=2,
adjustments made for reserved control channels)

(4) next_channel=[old_channel+Y+X] modulus #channels/application (where X is an integer margin to allow flexibility to skip channels and Y is an integer channel separation requirement)

(Note: need some local adjustment to skip fixed channel assignments, such as DCCH, Analog Control Channels, any other reserved channels.)

(5) old_channel=next_channel (6) For all subsequent channel assignments, repeat steps (4) and (5) described above.

In the case of system growth (i.e., addition of new cells), it may take a certain period of time before the long-term ordering adapts to the system characteristics and stabilizes. However, the above algorithm can be used for startup in the case of cells 18 that use ATCs.

The handoff process interacts closely with the IBDCA scheme. Handoff channels may have to be reserved in the dynamic channel environment. When selecting a channel at the new cell for handoff, the IBDCA scheme for channel assignment is used.

The standard for digital control channel IS-136A is incorporated herein by reference. The dynamic channel assignment scheme of the present invention is equally well suited for an indoor wireless communication network, including a PCS or similar network.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for controlling operations in a cellular system, comprising the steps of:
   (a) generating cost values for cell pairs in the cellular system, wherein each cost value corresponds to a cost of assigning a candidate channel to a first cell in the cellular system, assuming that the candidate channel is already assigned to a second cell in the cellular system and each cost value is based on reuse distances; and
   (b) using the cost values to dynamically control operations in the cellular system.

2. The invention of claim 1, wherein each cost value is based on an average power attenuation for all of the cells in the cellular system that share the same tier as the second cell with respect to the first cell, wherein the average power attenuation is based on the reuse distances between the first cell and the cells in the same tier as the second cell.

3. The invention of claim 1, wherein step (b) comprises the step of dynamically selecting and using a channel for a new call.

4. The invention of claim 3, wherein the channel is selected using a cost-function-based dynamic channel assignment (CFBDCA) algorithm.

5. The invention of claim 4, wherein the CFBDCA algorithm is applied to a list of candidate channels generated by a measurement-based dynamic channel assignment (MBDCA) algorithm.

6. The invention of claim 5, wherein:
   each cost value is based on an average power attenuation for all of the cells in the cellular system that share the same tier as the second cell with respect to the first cell, wherein the average power attenuation is based on the reuse distances between the first cell and the cells in the same tier as the second cell; and
   each cost value is a weighted average that takes into account the number of different cells in each tier that have the same reuse distance with respect to the first cell.

7. The invention of claim 1, wherein each cost value is a weighted average that takes into account the number of different cells in each tier that have the same reuse distance with respect to the first cell.

8. A cellular system, comprising:
   (a) a mobile switching center (MSC); and
   (b) a plurality of cell sites, communicating with the MSC, wherein:
   the MSC generates cost values for cell pairs in the cellular system, wherein each cost value corresponds to a cost of assigning a candidate channel to a first cell in the cellular system, assuming that the candidate channel is already assigned to a second cell in the cellular system and each cost value is based on reuse distances; and
   the MSC uses the cost values to dynamically control operations in the cellular system.

9. The invention of claim 8, wherein each cost value is based on an average power attenuation for all of the cells in the cellular system that share the same tier as the second cell with respect to the first cell, wherein the average power attenuation is based on the reuse distances between the first cell and the cells in the same tier as the second cell.

10. The invention of claim 8, wherein the MSC dynamically selects a channel for a new call and a cell site uses the channel for the new call.

11. The invention of claim 10, wherein the channel is selected using a CFBDCA algorithm.

12. The invention of claim 11, wherein the CFBDCA algorithm is applied to a list of candidate channels generated by an MBDCA algorithm.

13. The invention of claim 12, wherein:
   each cost value is based on an average power attenuation for all of the cells in the cellular system that share the same tier as the second cell with respect to the first cell, wherein the average power attenuation is based on the reuse distances between the first cell and the cells in the same tier as the second cell; and
   each cost value is a weighted average that takes into account the number of different cells in each tier that have the same reuse distance with respect to the first cell.

14. The invention of claim 8, wherein each cost value is a weighted average that takes into account the number of different cells in each tier that have the same reuse distance with respect to the first cell.

15. A mobile switching center (MSC) for a cellular system further comprising a plurality of cell sites, wherein:
   the MSC generates cost values for cell pairs in the cellular system, wherein each cost value corresponds to a cost of assigning a candidate channel to a first cell in the cellular system, assuming that the candidate channel is already assigned to a second cell in the cellular system and each cost value is based on reuse distances; and
   the MSC uses the cost values to dynamically control operations in the cellular system.

16. The invention of claim 15, wherein each cost value is based on an average power attenuation for all of the cells in the cellular system that share the same tier as the second cell with respect to the first cell, wherein the average power attenuation is based on the reuse distances between the first cell and the cells in the same tier as the second cell.

17. The invention of claim 15, wherein the MSC dynamically selects a channel for a new call and a cell site uses the channel for the new call.

18. The invention of claim 17, wherein the channel is selected using a CFBDCA algorithm.

19. The invention of claim 18, wherein the CFBDCA algorithm is applied to a list of candidate channels generated by an MBDCA algorithm.

20. The invention of claim 19, wherein:

each cost value is based on an average power attenuation for all of the cells in the cellular system that share the same tier as the second cell with respect to the first cell, wherein the average power attenuation is based on the reuse distances between the first cell and the cells in the same tier as the second cell; and each cost value is a weighted average that takes into account the number of different cells in each tier that have the same reuse distance with respect to the first cell.

21. The invention of claim 15, wherein each cost value is a weighted average that takes into account the number of different cells in each tier that have the same reuse distance with respect to the first cell.

* * * * *